April 9, 1940.                F. H. GULLIKSEN                2,196,413
                           CURRENT LIMITING DEVICE
                           Filed Aug. 25, 1938          2 Sheets-Sheet 1

Fig. 1.

WITNESSES:                                              INVENTOR
C. J. Weller.                                       Finn H. Gulliksen.
R. W. Bailey                                            BY
                                                    S. A. Strickler
                                                        ATTORNEY April 9, 1940.  F. H. GULLIKSEN  2,196,413
CURRENT LIMITING DEVICE
Filed Aug. 25, 1938  2 Sheets-Sheet 2

WITNESSES:
C.J.Weller.
R.W.Bailey

INVENTOR
Finn H. Gulliksen.
BY
S. A. Stricklett
ATTORNEY

Patented Apr. 9, 1940

2,196,413

UNITED STATES PATENT OFFICE 2,196,413

CURRENT LIMITING DEVICE

Finn H. Gulliksen, Pittsburgh, Pa., assignor to Westinghouse Electric & Manufacturing Company, East Pittsburgh, Pa., a corporation of Pennsylvania Application August 25, 1938, Serial No. 226,772

2 Claims. (Cl. 175—363)

My invention relates to rectifying systems and especially to rectifying systems utilizing grid controlled rectifiers.

An object of the invention is to provide means to limit the direct current load of a power rectifier to a predetermined value in order to protect the rectifier against overload.

Another object of the invention is to provide a current limiting circuit that will be operable only when the power rectifier circuit reaches its safe maximum current rating.

Figure 2:
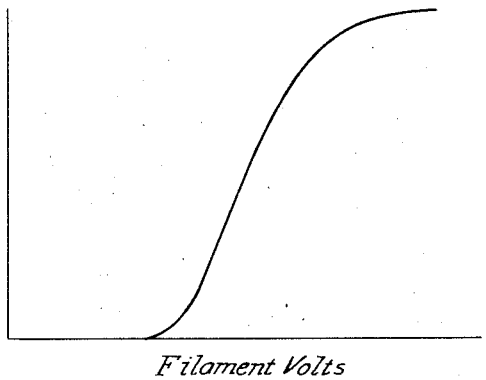
Figure 3:
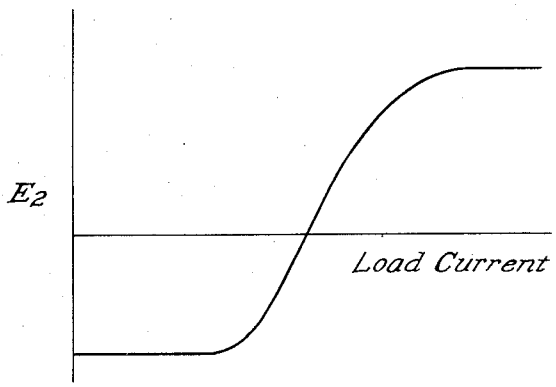
Figure 4:
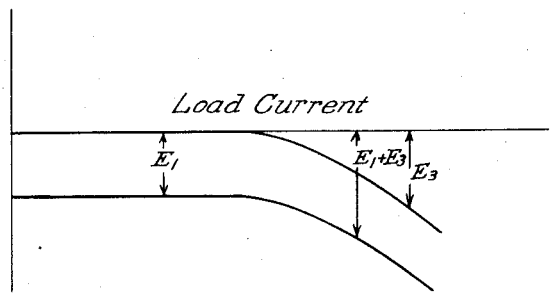

Other objects and advantages of the invention will be apparent from the following description and drawings in which:

Figure 1 is a diagrammatic circuit illustrating a preferred embodiment of the invention, and Figs. 2, 3 and 4 are graphs illustrating the voltage of various portions of the circuit of Fig. 1 in response to load current.

In rectifier circuits it is necessary to prevent excessive heating of the rectifier. In the prior art devices such protection meant interruption of the load current or an arrangement that affects and interferes with the regulation of the load circuit under normal conditions. My invention especially contemplates utilizing an arrangement whereby the protective part of the system operates only when the safe maximum current rating of the rectifier is obtained.

In Figure 1 I have disclosed my invention as applied to a rectifier circuit having the supply portion consisting of the alternating current lines 10, 11 and 12 supplying the delta primary 13 and a secondary 14. The rectifier portion consists preferably of three rectifiers 15, 16 and 17 connected respectively to the secondary 14 and having a common connection 18 to the load portion 19 which is in turn connected to the common return 20 to the secondary 14. The rectifiers are preferably of the type comprising a mercury pool cathode 21, anode 22 and grid 23. The grid control is obtained by having a phase-shifted alternating current voltage superimposed on a direct current voltage. The alternating current voltage is obtained through a phase shifter 24 connected to the alternating current lines and connected through a primary 25 and a secondary 26 to the respective grids of the three rectifier tubes 15, 16 and 17.

The direct current voltage may be obtained from a regulated battery 27, referred to also as $E_1$, which may be some other type or source in the place of the battery if desired. This voltage is preferably connected in the common return lead 28 to the secondary 26 across a resistance 29.

Another resistance 30 extends from the common terminal of the battery 27 on the resistance 29 to the lead 31 connected to the load and to the cathodes of the three rectifiers. The voltage across this resistance 30 will be referred to as $E_3$. The direct current bias voltage from the regulated voltage source 27 will be adjusted to give a definite direct current rectifier output voltage as needed under normal operation.

A rectifier tube 32 has its cathode 33 connected through a transformer 34 to a current transformer 35 in the primary circuit of the power transformer 13, 14. As disclosed, this may comprise a coil surrounding one of the leads 12 to the primary 13. The rectifier tube 32 is preferably the saturation type rectifier tube in which type the filament is of fine tungsten wire, so that the space current is dependent upon the voltage applied to the filament and the space current responds rapidly to changes in filament voltage. The type of tube especially adapted for this use is commercially known as type RO–585. The current through the tube 32 is, therefore, primarily dependent upon the current demanded by the load through the rectifiers and supply circuit 10, 11 and 12.

Inserted between the anode 36 of the tube 32 and the connection 37 to the positive side of the direct current voltage 27 is a rectifier tube 38 that will block any lowering of the voltage by means of the tube 32 before the load current reaches the overload or limiting value.

The auxiliary source of power 39 is connected across the voltage divider 40 to the cathode circuit of the tube 32 on one side and to a resistance 41 on the other side. This resistance is connected to the anode connection 42 of the tube 32. The voltage across the resistance 41 is designated as $E_r$. The midpoint 43 in the potentiometer 40 is connected through 44 to the connection 31 from the resistance 30 to the load and rectifier cathode connection 18.

The voltage on the load 19 will be regulated to a constant amount during the normal operation of the circuit. When the load demand becomes such that maintaining the constant voltage through 27 will produce an excessive current and heating in the rectifiers 15, 16 and 17, the current transformer 35 will bring the auxiliary source of electrical energy 39 into operation by the action of the tube 32.

In Fig. 2, I have illustrated the value of the voltage across the resistance $E_r$ in accordance with the filament voltage through the cathode 33 of the tube 32 which is in turn dependent upon and proportional in value to the load current demand from the supply circuit. The value of the maximum safe rectifier current is indicated. In Fig. 3, I have illustrated the voltage from the cathode circuit of the tube 38 to the connection 44 to the load circuit in respect to the load current. It will be noted that at the maximum safe rectifier current value this voltage passes through zero and will become more positive as the load increases.

In Fig. 4, I have illustrated the constant voltage $E_1$ supplied by the source 27 and also the maximum safe rectifier current where this voltage decreases and is added to by the voltage across the resistance 30 or $E_3$ to maintain a straight line.

It will be noted that the voltage is maintained at a constant value during normal operation of the load, but when the maximum safe rectifier current rating is reached the auxiliary source is brought in and the voltage will still be maintained constant. The circuit accordingly provides a means for bringing in an auxiliary source of electrical energy immediately the moment such source is needed. While the invention has many applications, it is especially adapted for electric railway service.

Many modifications may be made in the form, arrangement and means of the various elements disclosed in my preferred embodiment. The system can be adapted for protecting the rectifier circuit in various respects. Accordingly I desire only such limitations be imposed upon the following claims as is necessitated by the prior art.

I claim as my invention:

1. A circuit comprising an input portion, an output portion and a rectifier portion intermediate said input and output portion, said rectifier portion having at least one rectifier having control means therein, a control circuit connected to said rectifier control means including a voltage supply, a source of additional electrical energy and means connected with the input circuit controlling the application of said electrical energy to said control circuit including a saturation tube.

2. An electric translating system comprising a supply circuit, a load circuit, a rectifier having a maximum safe current rating for transferring electric energy between said circuits, control means for said rectifier, a source of control energy for said rectifier, a control circuit for supplying said control energy to said control means, an additional source of electrical energy and means including a saturation tube responsive to the current through said rectifier for supplying energy to said control circuit from said additional source of electrical energy.

FINN H. GULLIKSEN.